US012154481B2

(12) United States Patent
Bang et al.

(10) Patent No.: US 12,154,481 B2
(45) Date of Patent: Nov. 26, 2024

(54) DISPLAY DEVICE INCLUDING TEMPERATURE DETERMINER AND METHOD OF DRIVING THE SAME

(71) Applicant: SAMSUNG DISPLAY CO., LTD., Yongin-si (KR)

(72) Inventors: Sung Hoon Bang, Yongin-si (KR); Dong Ki Eun, Yongin-si (KR); Seung Ho Park, Yongin-si (KR); Seok Gyu Ban, Yongin-si (KR); Wook Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/229,789

(22) Filed: Aug. 3, 2023

(65) Prior Publication Data

US 2024/0105102 A1 Mar. 28, 2024

(30) Foreign Application Priority Data

Sep. 22, 2022 (KR) ........................ 10-2022-0120350

(51) Int. Cl.
*G09G 3/3233* (2016.01)
*G09G 3/20* (2006.01)

(52) U.S. Cl.
CPC ......... *G09G 3/2096* (2013.01); *G09G 3/3233* (2013.01); *G09G 2300/0452* (2013.01); *G09G 2300/0819* (2013.01); *G09G 2300/0842* (2013.01); *G09G 2310/08* (2013.01); *G09G 2320/041* (2013.01)

(58) Field of Classification Search
CPC ............... G09G 3/2096; G09G 3/3233; G09G 2300/0452; G09G 2300/0819; G09G 2300/0842; G09G 2310/08; G09G 2320/041
See application file for complete search history.

(56) References Cited

U.S. PATENT DOCUMENTS 11,398,182 B2 7/2022 Park et al.
2015/0257232 A1* 9/2015 Kimura ............. G02F 1/133603 349/61
2016/0086540 A1* 3/2016 Kim ..................... G09G 3/3275 345/214

(Continued)

FOREIGN PATENT DOCUMENTS

KR 102135926 7/2020
KR 1020220045592 4/2022

(Continued)

*Primary Examiner* — Rodney Amadiz
(74) *Attorney, Agent, or Firm* — CANTOR COLBURN LLP

(57) ABSTRACT

A display device includes a pixel component including first pixels which emits light having a first color, and second pixels which emits light having a second color different from the first color, a sensing component which extracts, during a sensing period, first sensing data from the first pixels, and second sensing data from the second pixels, and a temperature determiner which senses a temperature of the pixel component using the first sensing data and the second sensing data. The temperature determiner senses, when the first sensing data is supplied to the temperature determiner, the temperature of the pixel component at least one time.

17 Claims, 15 Drawing Sheets

(56) References Cited

U.S. PATENT DOCUMENTS

| | | | | |
|---|---|---|---|---|
| 2023/0137579 A1* | 5/2023 | Wu | H10K 50/87 | |
| | | | 345/694 | |
| 2023/0162670 A1 | 5/2023 | Bang et al. | | |
| 2023/0326403 A1* | 10/2023 | Huo | G09G 3/3233 | |

FOREIGN PATENT DOCUMENTS

| | | |
|---|---|---|
| KR | 102437173 B1 | 8/2022 |
| KR | 1020230074357 | 5/2023 |

* cited by examiner

| TV | | | MNT | | |
|---|---|---|---|---|---|
| 144Hz | 120Hz | 60Hz | 175Hz | 120Hz | 60Hz |
| 50s | 59s | 119s | 30s | 44s | 87s |

| | (th11) 25% | (th12) 50% | (th13) 75% | (th14) 100% |
|---|---|---|---|---|
| 1411 | 29 | 62 | 93 | 120 |
| 1412 | 37 | 63 | 94 | 120 |
| 1413 | 27 | 61 | 97 | 120 |
| 1414 | 29 | 61 | 86 | 120 |
| 1415 | 28 | 61 | 91 | 120 |
| 1416 | 33 | 64 | 92 | 120 |
| 1417 | 26 | 55 | 92 | 120 |
| 1418 | 32 | 63 | 92 | 120 |
| 1419 | 26 | 54 | 86 | 120 |
| 1420 | 30 | 60 | 97 | 120 |
| 1421 | 29 | 60 | 89 | 120 |
| 1422 | 37 | 62 | 89 | 120 |
| 1423 | 28 | 59 | 89 | 120 |
| 1424 | 34 | 62 | 87 | 120 |
| 1425 | 31 | 60 | 87 | 120 |
| 1426 | 24 | 60 | 94 | 120 |
| 1427 | 27 | 57 | 87 | 120 |
| 1428 | 33 | 56 | 78 | 120 |

t11 t12 t13 t14

| | TV | | | MNT | | |
|---|---|---|---|---|---|---|
| | 144Hz | 120Hz | 60Hz | 175Hz | 120Hz | 60Hz |
| EMBODIMENT 1 | 17s | 20s | 40s | 10s | 15s | 29s |
| EMBODIMENT 2 | 8s | 10s | 20s | 5s | 7s | 15s |
| EMBODIMENT 3 | 4s | 5s | 10s | 3s | 4s | 7s |

DISPLAY DEVICE INCLUDING TEMPERATURE DETERMINER AND METHOD OF DRIVING THE SAME

The application claims priority to Korean patent application number 10-2022-0120350, filed on Sep. 22, 2022, and all the benefits accruing therefrom under 35 U.S.C. § 119, the content of which in its entirety is herein incorporated by reference.

BACKGROUND

1. Field

Various embodiments of the disclosure relate to a display device and a method of driving the display device.

2. Description of Related Art

With a development of information technology, an importance of a display device, which is a connection medium between a user and information, has been emphasized. Owing to the importance of display devices, a use of various kinds of display devices, such as a liquid crystal display device and an organic light-emitting display device, has increased.

Pixels of the display devices may be degraded depending on duration of use, a display luminance, and temperatures of use. Hence, data correction (gray-scale correction) is desired. To this end, an external compensation method including receiving current from the pixels, extracting degradation information and temperature information of the pixels using the received current, and correcting data in response to the extracted information is being used.

SUMMARY

However, in the case of the external compensation method, because the temperature is determined after all pixels of a pixel component are sensed, a variation in temperature of the pixel component cannot be immediately reflected, so that the reliability may be reduced.

Various embodiments of the disclosure are directed to a display device capable of rapidly reflecting a variation in temperature of a pixel component (or panel), and a method of driving the display device.

An embodiment of the disclosure provides a display device including: a pixel component including first pixels which emits light having a first color, and second pixels which emits light having a second color different from the first color, a sensing component which extracts, during a sensing period, first sensing data from the first pixels, and second sensing data from the second pixels, and a temperature determiner which senses a temperature of the pixel component using the first sensing data and the second sensing data. The temperature determiner may sense, when the first sensing data is supplied to the temperature determiner, the temperature of the pixel component at least one time.

In an embodiment, the temperature determiner may sense, when the second sensing data is supplied to the temperature determiner, the temperature of the pixel component at least one time.

In an embodiment, the first sensing data and the second sensing data may be sequentially supplied during the sensing period.

In an embodiment, the temperature determiner may add the first sensing data when the second sensing data is supplied to the temperature determiner, and may sense the temperature of the pixel component.

In an embodiment, the pixel component may further include third pixels which emits light having a third color different from the first color and the second color.

In an embodiment, the sensing component may extract third sensing data from the third pixels during the sensing period. The temperature determiner may add the first sensing data and the second sensing data when the third sensing data is supplied thereto, and may sense the temperature of the pixel component at least one time.

In an embodiment, the temperature determiner may include: a memory which stores temperature data corresponding to sensed temperature output from the temperature determiner, a determiner which determines, using control data supplied from an external device, a position of a first pixel of the first pixels or a second pixel of the second pixels from which the first sensing data or the second sensing data is extracted, and a processor which receives position information from the determiner, and stores the temperature data in the memory at least one time when each of the first sensing data and the second sensing data is supplied to the processor.

In an embodiment, the processor may include an adding component which adds pieces of first sensing data and pieces of second sensing data that are sequentially supplied.

In an embodiment, the processor may further include a controller which generates the temperature data using added sensing data output from the adding component. The temperature determiner may further include a look up table which stores temperature information corresponding to the added sensing data.

In an embodiment, the processor may further include: an averaging component which averages added sensing data output from the adding component, and a controller which generates the temperature data using averaged sensing data output from the averaging component. The temperature determiner may further include a look up table which stores temperature information corresponding to the averaged sensing data.

In an embodiment, the pixel component may be divided into a plurality of blocks to include two or more pixel rows. The processor may store the temperature data in the memory in units of the plurality of blocks.

In an embodiment, information about a plurality of threshold values and information about the plurality of blocks may be formed in the memory. The processor may store, when the first sensing data is supplied to the processor, the temperature data in the memory at least two times for each of the plurality of blocks in response to the information about the plurality of threshold values.

In an embodiment, the processor may store, when the second sensing data is supplied thereto, the temperature data in the memory at least two times for each of the blocks in response to the information about the plurality of threshold values.

In an embodiment, the processor may further include a weighting component which applies different weight values to the first sensing data and the second sensing data.

An embodiment of the disclosure provides a method of driving a display device including a first color of first pixels, a second color of second pixels, and a third color of third pixels, including: receiving, during a sensing period, pieces of first sensing data from the first pixels, pieces of second sensing data from the second pixels, and pieces of third sensing data from the third pixels, and sensing a temperature of a pixel component at least one time each time the pieces of the first sensing data, the pieces of the second sensing data, and the pieces of the third sensing data are supplied.

In an embodiment, in sensing the temperature, the pieces of the first sensing data, the pieces of the second sensing data, and the pieces of the third sensing data may be sequentially supplied, and the pieces of the first sensing data, the pieces of the second sensing data, and the pieces of the third sensing data may be sequentially added.

In an embodiment, sensing the temperature may include sensing the temperature of the pixel component at a set cycle using an added value of at least one kind of pieces of sensing data among the pieces of the first sensing data, the pieces of the second sensing data, and the pieces of the third sensing data, or using an average of the added value.

In an embodiment, the pixel component may be divided into a plurality of blocks. Sensing the temperature may include sensing the temperature of the pixel component in units of the plurality of blocks.

In an embodiment, the temperature may be sensed at least two times in each of the plurality of blocks.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
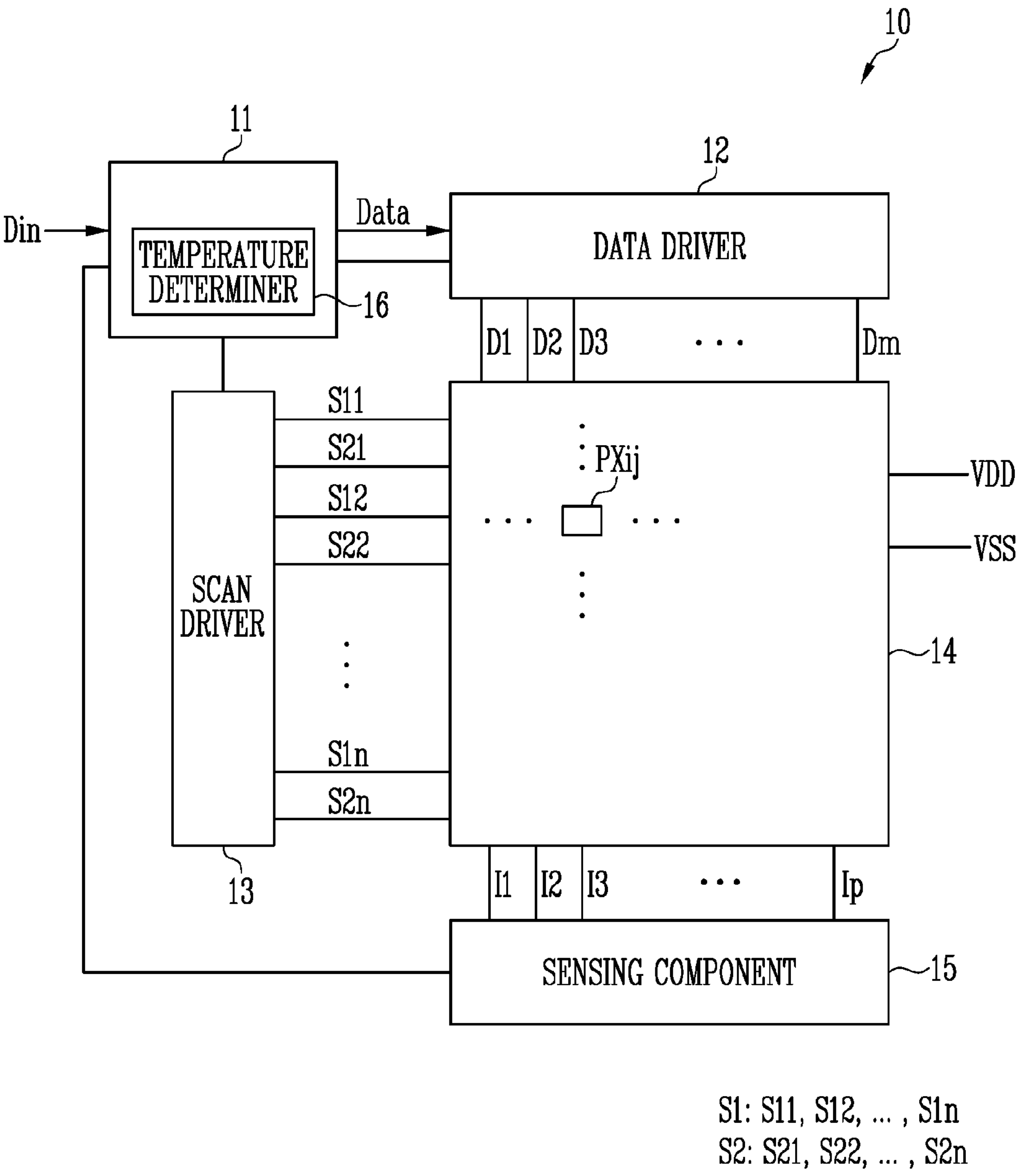
FIG. 1 is a diagram illustrating an embodiment of a display device in accordance with the disclosure.

Hereinafter, embodiments of the invention will be described in detail with reference to the attached drawings, such that those skilled in the art may easily implement the invention. The disclosure may be implemented in various forms, and is not limited to the embodiments to be described herein below.

In the drawings, portions which are not related to the disclosure will be omitted in order to explain the disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that may be tolerated by those skilled in the art. The other expressions may also be expressions from which the term "substantially" has been omitted.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within f 30%, 20%, 10%, 5% of the stated value, for example.

The term "component" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

FIG. 1 is a diagram illustrating an embodiment of a display device 10 in accordance with the disclosure.

Referring to FIG. 1, the display device 10 in an embodiment of the disclosure may include a timing controller 11, a data driver 12, a scan driver 13, a pixel component 14, and a sensing component 15.

The timing controller 11 may receive, from an external process, input data Din and control signals that correspond to each frame. Here, the processor may include at least one of a graphics processing unit ("GPU"), a central processing unit ("CPU"), an application processor ("AP"), or the like.

The timing controller 11 may correct the input data Din and generate output data Data, and supply the output data Data to the data driver 12. Here, the timing controller 11 may correct the input data Din, in response to a threshold voltage of a driving transistor included in a pixel, e.g., PXij described later, and/or degradation information of a light-emitting element. Furthermore, the timing controller 11 may correct the input data Din in response to a light measurement result of the pixel component 14 measured during a processing operation. In an embodiment, the timing controller 11 may correct the input data Din using various known methods, and generate the output data Data.

In addition, the timing controller 11 may sense the temperature of the pixel component 14 in response to a sensing result of the sensing component 15, and then correct the output data Data in reflection of a result of the temperature sensing. To achieve the above-mentioned purpose, the timing controller 11 may include a temperature determiner 16.

The temperature determiner 16 may determine the temperature of the pixel component 14 in response to a sensing result from the sensing component 15, and provide the determined temperature information (or temperature data) to the timing controller 11. In an embodiment, the temperature determiner 16 may sense the temperature of the pixel component 14 at least two times during a period in which all of the pixels PX included in the pixel component 14 are sensed, for example.

The timing controller 11 may correct the threshold voltage and degradation information of each of the pixels using the temperature information. In an embodiment, the timing controller 11 may additionally correct the gray scale of the output data Data in response to the temperature information. In an embodiment, the temperature of the pixel component 14 that is measured by the temperature determiner 16 may be used by various known methods.

Although FIG. 1 illustrates that the temperature determiner 16 is disposed in the timing controller 11, the disclosure is not limited thereto. In an embodiment, the temperature determiner 16 may be implemented as separate hardware or software in the timing controller 11. In an alternative embodiment, the temperature determiner 16 may be disposed outside the timing controller 11 and implemented as separate hardware or software. In an alternative embodiment, the temperature determiner 16 may be implemented in another component (e.g., the sensing component 15, the data driver 12, or the like)

Furthermore, the timing controller 11 may provide control signals suitable for respective specifications of the data driver 12, the scan driver 13, and the sensing component 15.

During a display period, the data driver 12 may generate, using the output data Data and the control signals that are provided from the timing controller 11, data signals (or data voltages) to be supplied to the data lines D1 to Dm (here, "m" is a natural number). The data driver 12 may supply data signals to the data lines D1 to Dm on a pixel row basis (or a horizontal line basis). Here, the pixel row may refer to a horizontal line in which pixels connected to an identical scan line are disposed. During a sensing period, the data driver 12 may supply a reference voltage to the data lines D1 to Dm.

In response to the control signals supplied from the timing controller 11, the scan driver 13 may supply first scan signals to first scan lines S11 to S1*n* (also referred to as S1 for convenience) (here, "n" is a natural number), and supply second scan signals to second scan lines S21 to S2*n* (also referred to as S2 for convenience).

In an embodiment, the scan driver 13 may sequentially supply first scan signals each having a gate-on voltage (or a turn-on level) to the first scan lines S11 to Sin, for example. Furthermore, the scan driver 13 may sequentially supply second scan signals each having a gate-on voltage to the second scan lines S21 to S2*n*. Although FIG. 1 illustrates that one scan driver 13 drives the first scan lines S11 to S1*n* and the second scan lines S21 to S2*n*, the disclosure is not limited thereto. In an embodiment, the first scan lines S11 to S1*n* and the second scan lines S21 to S2*n* may be respectively supplied with scan signals from different scan drivers, for example.

During a display period, the sensing component 15 may supply a voltage of an initialization power supply to sensing lines I1 to Ip (here, "p" is a natural number). During a sensing period, the sensing component 15 may receive sensing voltages from the pixels connected to the sensing lines I1 to Ip. Here, the sensing voltages may include a threshold voltage of a driving transistor included in each of the pixels, degradation information of the light-emitting element, and/or temperature information corresponding to a position of each of the pixels. The sensing component 15 may convert an analog sensing voltage to digital sensing data, and supply the converted digital sensing data to the timing controller 11.

The pixel component 14 includes pixels. The pixels may receive data signals and display an image. To this end, each pixel may be connected to a corresponding data line (any one of D1 to Dm), corresponding scan lines (any one of S11 to S1*n* and any one of S21 to S2*n*), and a corresponding sensing line (any one of I1 to Ip). The pixels may be supplied with voltages of a first power supply VDD and a second power supply VSS from an external device. In an embodiment, the first power supply VDD may be set to a voltage higher than the second power supply VSS.

Figure 2:
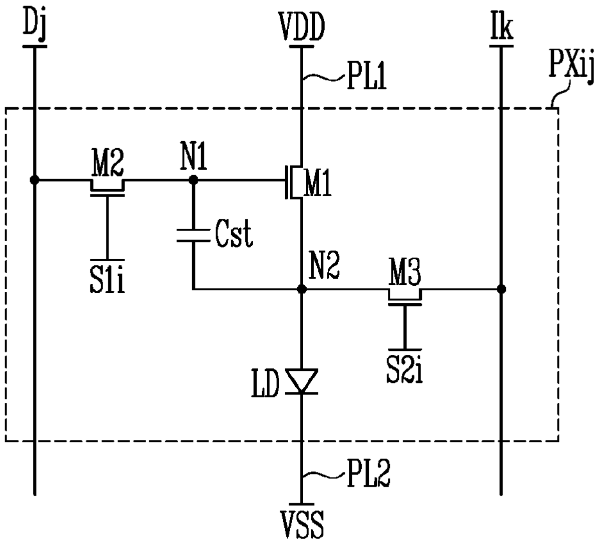
FIG. 2 is a diagram illustrating an embodiment of a pixel in accordance with the disclosure.

FIG. 2 is a diagram illustrating a pixel in accordance with the disclosure. FIG. 2 illustrates a pixel disposed on an i-th horizontal line and a j-th vertical line (here, "i" and "j" are natural numbers).

Referring to FIG. 2, a pixel PXij in an embodiment of the disclosure may include transistors M1 to M3, a storage capacitor Cst, and a light-emitting element LD.

The light-emitting element LD may be connected between a first power line PL1 to which the first power VDD is to be supplied, and a second power line PL2 to which the second power VSS is to be supplied. In an embodiment, a first electrode (e.g., an anode electrode) of the light-emitting element LD may be connected to the first power line PL1 via a second node N2 and the first transistor M1, for example. A second electrode (e.g., a cathode electrode) of the light-emitting element LD may be connected to the second power line PL2. The light-emitting element LD may emit light at a luminance corresponding to driving current supplied from the first transistor M1.

The voltage of the first power supply VDD and the voltage of the second power supply VSS may have a potential difference therebetween to allow the light-emitting element LD to emit light. In an embodiment, the first power supply VDD may be a high-potential power supply having a high voltage, for example. The second power supply VSS may be a low-potential power supply having a low voltage.

An organic light-emitting diode may be selected as the light-emitting element LD. Furthermore, an inorganic light-emitting diode such as a micro light-emitting diode ("LED") or a quantum dot light-emitting diode may be selected as the light-emitting element LD. The light-emitting element LD may be an element including or consisting of a combination of organic material and inorganic material. Although FIG. 2 illustrates that the pixel PXij includes a single light-emitting element LD, the pixel PXij in an embodiment may include a plurality of light-emitting elements. The plurality of light-emitting elements may be connected in series, parallel or series-parallel to each other.

Each of the transistors M1, M2, and M3 may consist of an N-type transistor. In an alternative embodiment, each of the transistors M1, M2, and M3 may consist of a P-type transistor. In an alternative embodiment, each of the transistors M1, M2, and M3 may consist of a combination of an N-type transistor and a P-type transistor. Each transistor may be configured in various forms such as a thin film transistor ("TFT"), a field effect transistor ("FET"), and a bipolar junction transistor ("BJT").

The first transistor M1 is connected between the first power line PL1 and the second node N2. A gate electrode of the first transistor M1 is coupled to the first node N1. The first transistor M1 may control, in response to a voltage of the first node N1, the amount of current flowing from the first power supply VDD to the second power supply VSS via the light-emitting element LD. The first transistor M1 may be also referred to as a driving transistor.

The second transistor M2 may be connected between a data line Dj and the first node N1. A gate electrode of the second transistor M2 may be connected to the first scan line S1*i*. When a first scan signal is supplied to the first scan line S1*i*, the second transistor M2 may be turned on to electrically connect the data line Dj with the first node N1.

The third transistor M3 may be connected between the second node N2 and a sensing line Ik (here, "k" is a natural number). A gate electrode of the third transistor M3 may be connected to the second scan line S2*i*. When a second scan signal is supplied to the second scan line S2*i*, the third transistor M3 may be turned on to electrically connect the sensing line Ik with the second node N2.

The storage capacitor Cst may be connected between the first node N1 and the second node N2. The storage capacitor Cst may store a voltage corresponding to a difference in voltage between the first node N1 and the second node N2.

Figure 3:
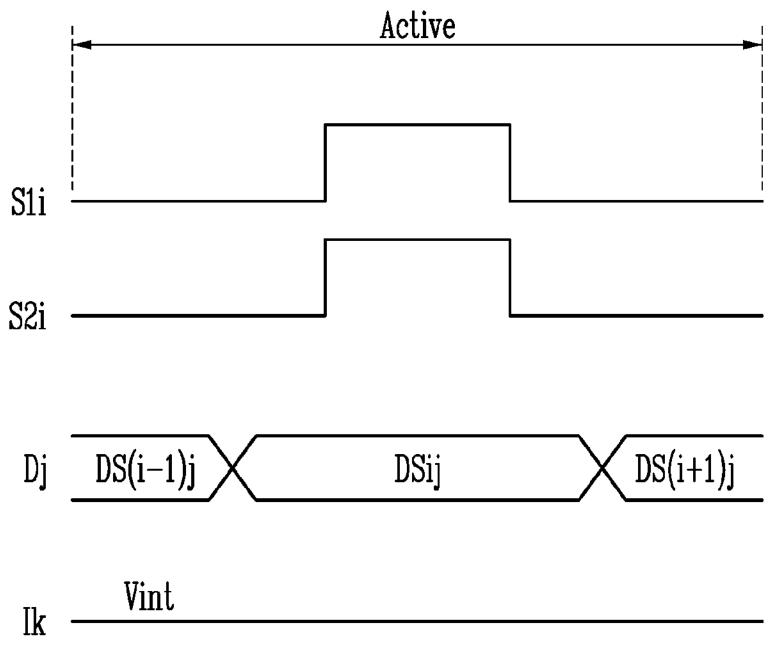
FIG. 3 is a waveform diagram for describing a method of driving the pixel during a display period.

FIG. 3 is a waveform diagram for describing a method of driving the pixel during a display period.

Figure 4:
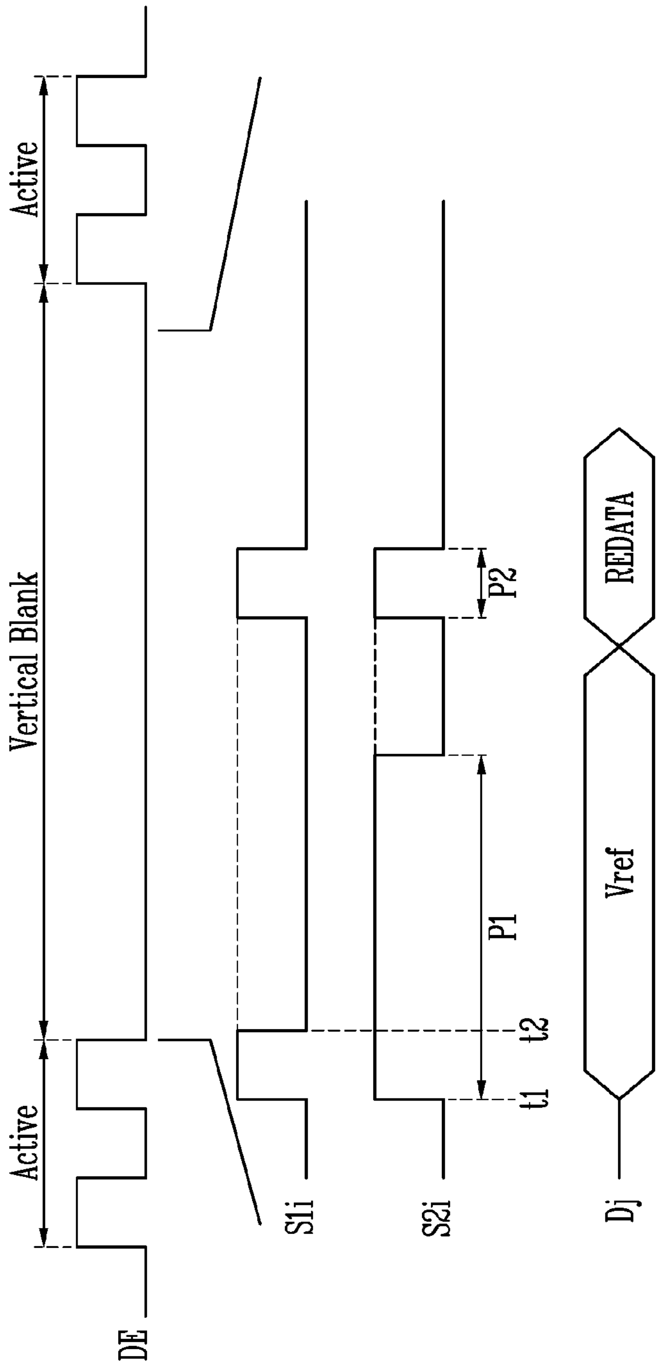
FIG. 4 is a waveform diagram for describing a method of driving the pixel during a sensing period.

FIG. 4 is a waveform diagram for describing a method of driving the pixel during a sensing period.

Referring to FIGS. 3 and 4, each frame period may include an active section Active, a vertical blank section Vertical Blank between adjacent active sections. In FIGS. 3 and 4, a data enable signal DE may define an active section in which a data signal is applied. In an embodiment, a section in which the data enable signal DE is supplied (in the form of a pulse) may be defined as an active section, for example. A section in which the data enable signal DE is not supplied (a constant voltage is maintained) may be defined as a vertical blank section.

Referring to FIG. 3, a voltage of an initialization power supply Vint may be supplied to the sensing line Ik in an active section during the display period. During the display period, a first scan signal is supplied to the first scan line S1*i*, and a second scan signal is supplied to the second scan line S2*i*.

When the first scan signal is supplied to the first scan line S1*i*, the second transistor M2 may be turned on. When the second transistor M2 is turned on, a data signal DSij may be supplied from the data line Dj to the first node N1. When the second scan signal is supplied to the second scan line S2*i*, the third transistor M3 may be turned on. When the third transistor M3 is turned on, the voltage of the initialization power source Vint is supplied from the sensing line Ik to the second node N2. Here, a voltage corresponding to a difference between the voltage of the data signal DSij and the voltage of the initialization power supply Vint may be stored in the storage capacitor Cst.

After a voltage corresponding to the data signal DSij is stored in the storage capacitor Cst, the supply of the first scan signal to the first scan line S1*i* is interrupted, so that the second transistor M2 is turned off, and the supply of the second scan signal to the second scan line S2*i* is interrupted, so that the third transistor M3 is turned off. Thereafter, the first transistor M1 may supply current corresponding to the voltage stored in the storage capacitor Cst to the light-emitting element LD. The luminance of the light-emitting element LD may be determined in response to the amount of current supplied from the first transistor M1 to the light-emitting element LD.

Referring to FIG. 4, sensing information may be extracted from at least one pixel row in a vertical blank section during a sensing period. In an embodiment, in the case where the i-th scan lines S1*i* and S2*i* are driven, sensing information may be extracted from pixels corresponding to a predetermined color among the pixels disposed on the i-th pixel row, for example.

In more detail, the pixels included in the pixel component 14 may include a first pixel which emits a first color of light, a second pixel which emits a second color of light, and a third pixel which emits a third color of light. Here, the first color may be set to a color different from the second color or the third color, and the second color may be set to a color different from the first color or the third color.

In an embodiment, the first color may be set to red, the second color may be set to green, and the third color may be set to blue. In an alternative embodiment, the first color may be set to magenta, the second color may be set to cyan, and the third color may be set to yellow. In the following description, for convenience of explanation, it is assumed that the first pixel may emit red light, the second pixel may emit green light, and the third pixel may emit blue light.

The sensing lines I1 to Ip may be disposed on respective pixel columns, and may be connected to the pixels disposed on the pixel column. Here, the pixel column may refer to a vertical line of pixels that are connected to an identical data line. Furthermore, the sensing lines I1 to Ip may be disposed on the respective pixel columns. In an embodiment, each of the sensing lines I1 to Ip may be connected in common to a first pixel, a second pixel, and a third pixel which are adjacent to each other. A structure in which the pixels are connected to the sensing lines I1 to Ip may be implemented in various known shapes.

The scan driver 13 may randomly supply a scan signal to the scan lines S1 and S2 during the sensing period. The sensing component may extract sensing data in a sequence of first pixels, second pixels, and third pixels. In an embodiment, the scan driver 13 may randomly the scan signal to the scan lines S1 and S2 such that the entirety of the pixel row is uniformly scanned, for example. Here, the sensing component 15 may extract sensing data from all of the first pixels disposed in the pixel component 14, and thereafter extract sensing data in a sequence of the second pixels and the third pixels. Here, although the sensing data is extracted in a sequence of the first pixels, the second pixels, and the third pixels, the disclosure is not limited thereto, and it may be set in various ways as desired. In an embodiment, the sensing data may be extracted in a sequence of the second pixels, the third pixels, and the first pixels, for example.

In the case where a scan signal is supplied to the i-th scan lines S1*i* and S2*i* during the sensing period, sensing data may be extracted from pixels corresponding to any one color among the first pixels, the second pixels, and the third pixels of the pixels that are disposed on the i-th pixel row. In this case, sensing data of all of the first pixels, the second pixels, and the third pixels that are disposed on the i-th pixel row may be extracted after the scan signal is supplied to the scan lines S1*i* and S2*i* of the i-th pixel row during three successive or non-successive vertical blank sections.

The vertical blank section included in the sensing period may be divided into a first section P1 and a second section P2. The first section P1 may be a section in which a sensing voltage (i.e., sensing data) is extracted. The second section P2 may be a section in which data is re-written.

During the first section P1, at a first time point t1, a first scan signal is supplied to the first scan line S1*i*, and a second scan signal is supplied to the second scan line S2*i*. When the first scan signal and the second scan signal are supplied, the second transistor M2 and the third transistor M3 are turned on.

When the second transistor M2 is turned on, a reference voltage Vref is supplied from the data line Dj to the first node N1. Here, the reference voltage Vref may be a voltage capable of turning on the first transistor M1, and may be preset.

When the third transistor M3 is turned on, the voltage of the initialization power supply Vint is supplied to the second node N2. Thereby, the storage capacitor Cst is charged with a voltage corresponding to a difference in voltage between the reference voltage Vref and the initialization power supply Vint. In addition, the supply of the voltage of the initialization power supply Vint to the sensing line Ik is interrupted after a second time point t2.

After the second time point t2, the supply of the first scan signal is interrupted, and the supply of the second scan signal is maintained. Then, during the remnant of the first period P1 after the second time point t2, the third transistor M3 remains turned on. The first transistor M1 may supply current corresponding to the reference voltage to the second node N2, so that a sensing voltage is supplied to the second node N2. The sensing component 15 converts an analog sensing voltage to digital sensing data, and supplies the converted digital sensing data to the timing controller 11. Here, the sensing data includes information about the threshold voltage and mobility of the first transistor M1. Furthermore, the sensing data includes information about the temperature of the pixel PXij.

The second section P2 may be a section in which a previous data signal is supplied to restore an image display state preceding the sensing period. During the second section P2, a first scan signal is supplied to the first scan line S1*i*, and a second scan signal is supplied to the second scan line S2*i*. When the first scan signal and the second scan signal are supplied, the second transistor M2 and the third transistor M3 are turned on.

When the second transistor M2 is turned on, a voltage of a previous data signal REDATA is supplied to the first node N1. When the third transistor M3 is turned on, a voltage of the initialization power supply Vint is supplied to the second node N2. Here, the storage capacitor Cst is charged with a voltage corresponding to the previous data signal REDATA. Thereafter, the pixel PXij generates light having a luminance corresponding to the previous data signal REDATA.

Figure 5:
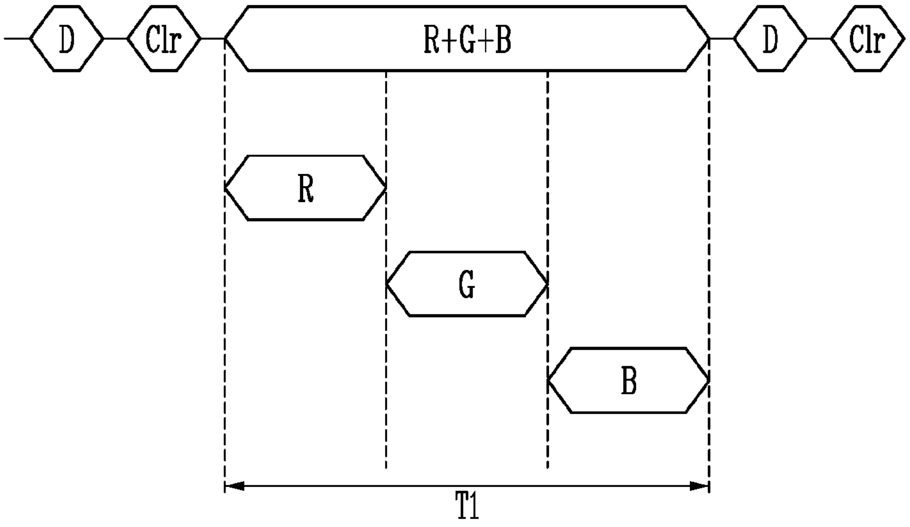
FIG. 5 is a diagram illustrating a method of determining temperature information of a pixel component in accordance with a comparative example.

FIG. 5 is a diagram illustrating a method of determining temperature information of a pixel component in accordance with a comparative example. In FIG. 5, the reference character "D" refers to a time point at which temperature data is updated, and the reference character "Clr" refers to a time point at which a memory is initialized.

Referring to FIG. 5, during a sensing period, a scan signal is randomly supplied to the scan lines S1 and S2, and sensing data are extracted in a sequence of the first pixels, the second pixels, and the third pixels. Here, the sequence in which the sensing data is extracted may be set in various ways.

In the case where, as illustrated in FIG. 5, the sensing data is extracted, a first time duration T1 is desired to extract sensing data from all of the pixels of the pixel component 14. After the sensing data is extracted from all of the pixels of the pixel component 14, the timing controller 11 uses the extracted sensing data to determine the temperature of the pixel component 14.

Figure 6:
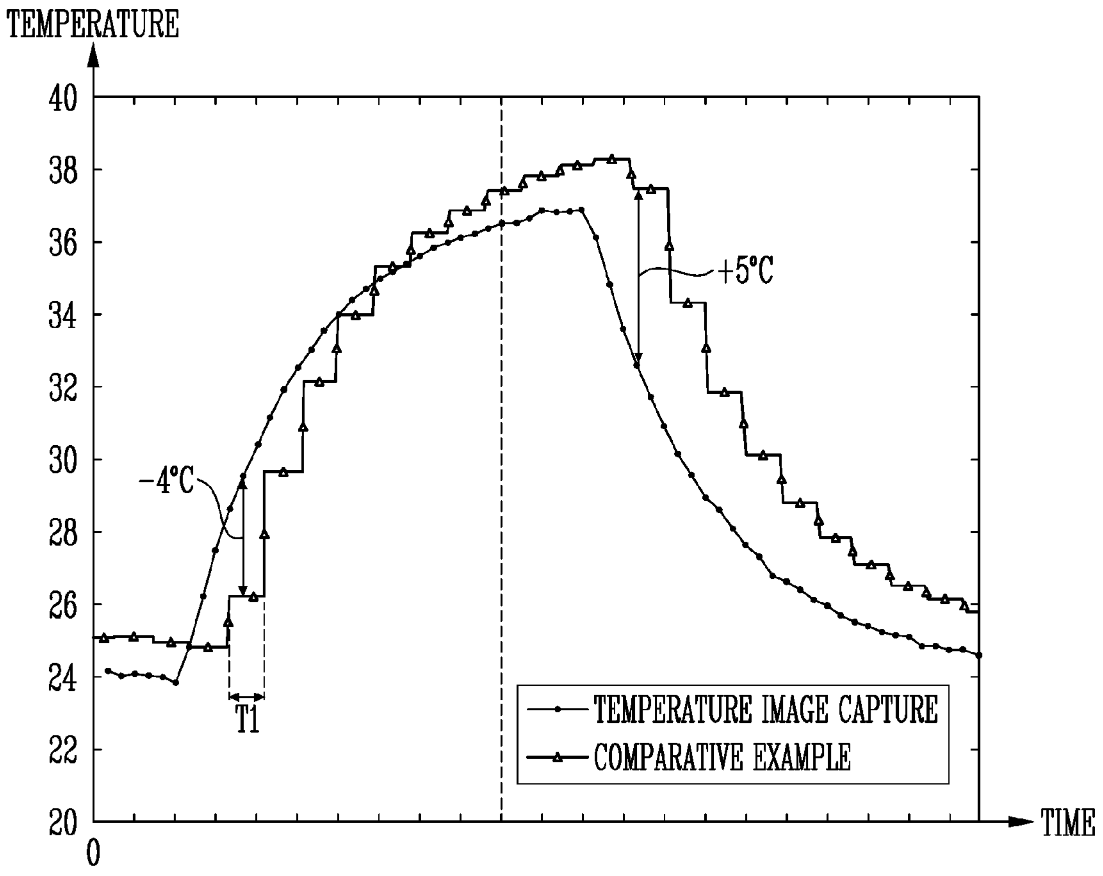
FIG. 6 is a graph illustrating the comparative example of errors of the temperature information of the comparative example of FIG. 5.

FIG. 6 is a graph illustrating the comparative example of errors of the temperature information of the comparative example of FIG. 5.

FIG. 6 illustrates the case where full-black images and full-white images are alternately displayed such that the temperature of the pixel component 14 may be rapidly changed.

Referring to FIG. 6, the temperature of the pixel component 14 that is sensed by the timing controller 11 may be updated at an interval of the first time duration T1. Here, the first time duration T1 refers to a time during which the sensing data is extracted from all of the pixels of the pixel component 14. Because the first time duration T1 is set to a relatively long time, the temperature of the pixel component 14 cannot be rapidly updated, so that there may be an error in a sensed temperature.

In an embodiment, in the case where an ultra-high definition ("UHD") television TV having 2160 pixel rows is driven at about 144 Hz, the first time duration T1 may be set to about 50 seconds. In the case where the UHD television TV is driven at about 120 Hz, the first time duration T1 may be set to about 59 seconds. In the case where the UHD television TV is driven at about 60 Hz, the first time duration T1 may be set to about 119 seconds.

Furthermore, in the case where a UHD monitor MNT is driven at about 175 Hz, the first time duration T1 may be set to about 30 seconds. In the case where the UHD monitor MNT is driven at about 120 Hz, the first time duration T1 may be set to about 44 seconds. In the case where the UHD television TV is driven at about 60 Hz, the first time duration T1 may be set to about 87 seconds.

As such, when the temperature is updated every first time duration T1, a temperature difference of approximately 5 degrees Celsius (° C.) may occur between a temperature measured by capturing an image of the pixel component 14 and a temperature measured using sensing data, as shown in the graph of FIG. 5 (in the case of the UHD television TV that is driven at about 120 Hz.). In other words, in the case where, as shown in the comparative example, the temperature information is updated every first time duration T1, it is difficult to rapidly reflect the temperature of the pixel component 14, so that the reliability of the display device 10 may be reduced.

Figure 7:
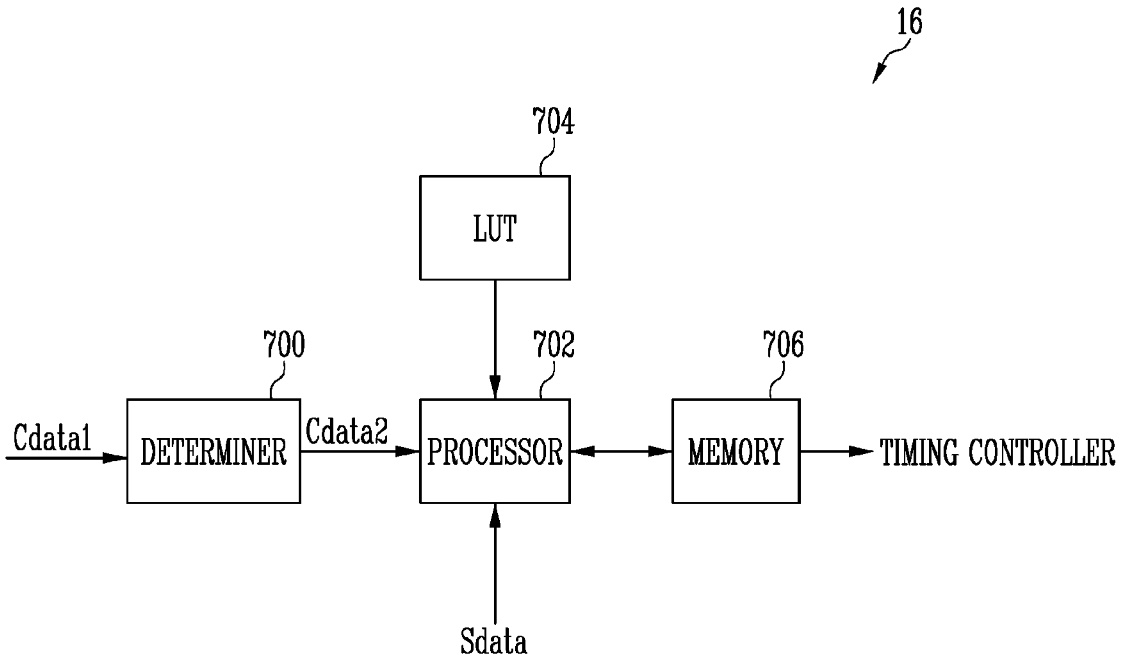
FIG. 7 is a diagram illustrating an embodiment of a temperature determiner in accordance with the disclosure.

FIG. 7 is a diagram illustrating an embodiment of the temperature determiner 16 in accordance with the disclosure.

Referring to FIG. 7, the temperature determiner 16 in an embodiment of the disclosure may include a determiner 700, a processor 702, a look up table ("LUT") 704, and a memory 706.

The determiner 700 may be supplied with first control data Cdata1 from the timing controller 11. The first control data Cdata1 may include information about a pixel row sensed during a sensing period, and information about the color of a pixel. The determiner 700 may determine, using the first control data Cdata1, that a first pixel (or a second pixel, or a third pixel) of an i-th pixel row is currently sensed. The determiner 700 may convert the information about the pixel row and the color of the pixel that are determined using the first control data Cdata1 to second control data Cdata2, and supply the second control data Cdata2 to the processor 702.

Temperature information corresponding to added and/or averaged sensing data may be stored in the LUT 704.

The processor 702 may receive the second control data Cdata2 and sensing data Sdata. The processor 702 may determine, using the second control data Cdata2, the pixel row information of the sensing data Sdata that is currently supplied, and the color information of the pixel. The processor 702 may add and/or average the sensing data Sdata, and periodically store temperature information corresponding to the added and/or averaged sensing data in the memory 706.

Figure 8:
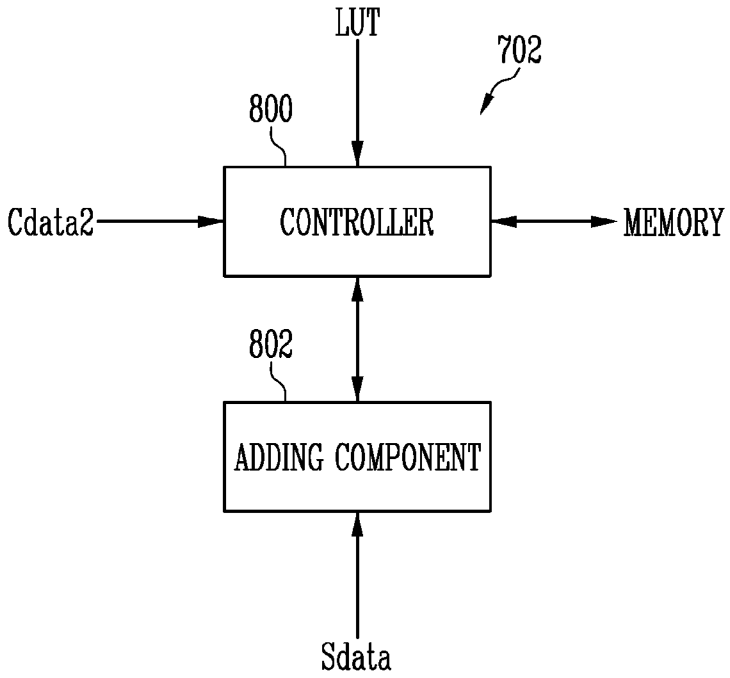
FIG. 8 is a diagram illustrating an embodiment of a processor shown in FIG. 7.

FIG. 8 is a diagram illustrating an embodiment of the processor 702 shown in FIG. 7.

Referring to FIG. 8, the processor 702 may include a controller 800 and an adding component 802.

The adding component 802 may receive sensing data Sdata. The adding component 802 that has received the sensing data Sdata may add the sensing data Sdata.

The controller 800 may receive the second control data Cdata2. The controller 800 that has received the second control data Cdata2 may determine pixel row information and pixel color information of the sensing data Sdata that is currently received. In this case, temperature information corresponding to the added sensing data may be stored in the LUT 704.

The controller 800 may determine the temperature information using the added sensing data for each preset cycle, and store the determined temperature information (i.e., temperature data) in the memory 706. Here, the preset cycle may be set to a time shorter than the time T1 shown in FIG. 5.

Figure 9:
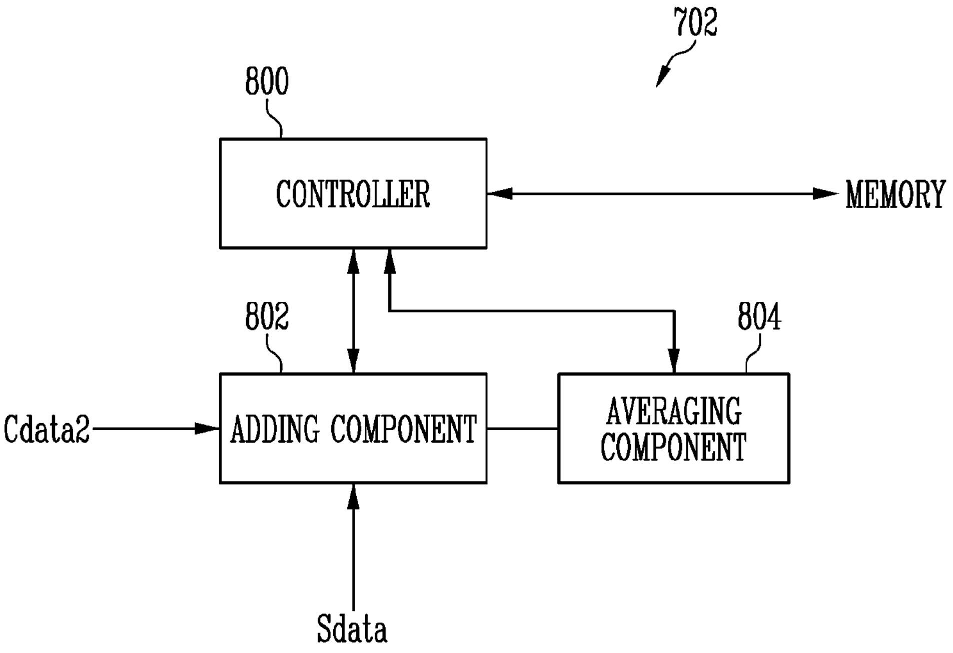
FIG. 9 is a diagram illustrating an embodiment of the processor shown in FIG. 7.

FIG. 9 is a diagram illustrating an embodiment of the processor 702 shown in FIG. 7.

In the following description of FIG. 9, the same reference numerals will be used to designate the same components as those of FIG. 8, and detailed explanation thereof will be omitted.

Referring to FIG. 9, a processor 702 in an embodiment of the disclosure may further include an averaging component 804.

The averaging component 804 may average the sensing data added by the adding component 802. In an embodiment, the averaging component 804 may average the sensing data added for each preset cycle, under control of the controller 800, for example.

The controller 800 may determine the temperature information using the averaged sensing data for each preset cycle, and store the determined temperature information (i.e., temperature data) in the memory 706. In this case, temperature information corresponding to the averaged sensing data may be stored in the LUT 704.

Figure 10:
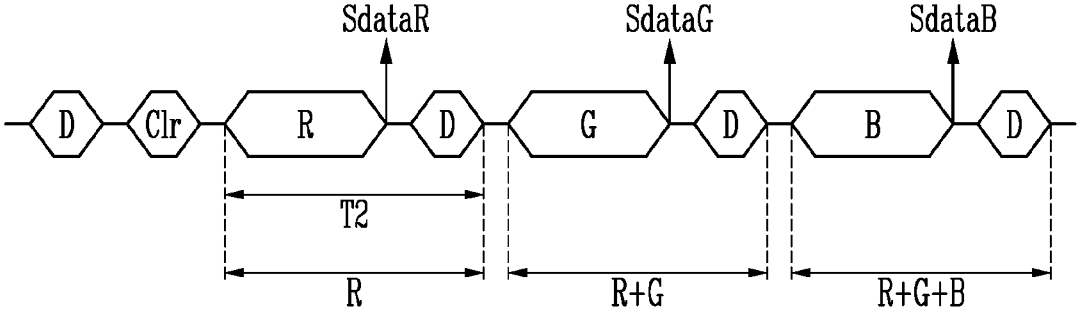
FIG. 10 is a diagram illustrating an embodiment of a method of sensing the temperature of the pixel component in accordance with the disclosure.

FIG. 10 is a diagram illustrating an embodiment of a method of sensing the temperature of the pixel component in accordance with the disclosure.

In FIG. 10, the reference character "D" means that temperature data is updated, and the reference character "Clr" means that the memory 706 is initialized.

Referring to FIG. 10, first, the memory 706 may be initialized before the temperature information is updated. Here, a process of initializing the memory 706 may be omitted, as desired.

In addition, although FIG. 10 illustrates that the sensing data Sdata is extracted in a sequence of the first pixel, the second pixel, and the third pixel during the sensing period, the disclosure is not limited thereto. The sequence in which the sensing data Sdata is extracted during the sensing period may be set in various ways.

While a scan signal is randomly supplied to the scan lines S1 and S2 during the sensing period after the memory 706 is initialized, the sensing data Sdata may be extracted from the first pixels of the pixel component 14. When it is determined that all of the first pixels of the pixel component 14 have been sensed, the controller 800 may generate first temperature data using first color sensing data SdataR obtained by adding and/or averaging the sensing data Sdata of the first pixels. The first temperature data generated from the controller 800 may be stored in the memory 706. Thereafter, the timing controller 11 may sense the temperature of the pixel component 14 using the first temperature data stored in the memory 706.

As described above, in the embodiment of the disclosure shown in FIG. 10, the temperature of the pixel component 14 may be sensed every second time duration T2 shorter than the first time duration T1. In other words, in the case of the embodiment of the disclosure shown in FIG. 10, the temperature of the pixel component 14 may be rapidly sensed compared to the comparative example, so that the reliability of the display device 10 may be enhanced. Here, the second time duration T2 may be set to a time corresponding to approximately ⅓ of the first time duration T1.

Thereafter, while a scan signal is randomly supplied to the scan lines S1 and S2, sensing data Sdata may be extracted from the second pixels of the pixel component 14. When it is determined that all of the second pixels of the pixel component 14 have been sensed, the controller 800 may generate second temperature data using second color sensing data SdataG obtained by adding and/or averaging the sensing data Sdata of the second pixels. Here, the second color sensing data SdataG may be generated including (i.e., adding (or averaging)) the first color sensing data SdataR that has been extracted during a previous period. The second temperature data generated from the controller 800 may be stored in the memory 706. Here, the second temperature data may be generated using the first color sensing data SdataR and the second color sensing data SdataG, so that the second temperature data may more accurately reflect the temperature of the pixel component 14 compared to that of the first temperature data. The timing controller 11 may sense the temperature of the pixel component 14 using the second temperature data stored in the memory 706.

Thereafter, while a scan signal is randomly supplied to the scan lines S1 and S2, sensing data Sdata may be extracted from the third pixels of the pixel component 14. When it is determined that all of the third pixels of the pixel component 14 have been sensed, the controller 800 may generate third temperature data using third color sensing data SdataB obtained by adding and/or averaging the sensing data Sdata of the third pixels. Here, the third color sensing data SdataB may be generated including (i.e., adding (or averaging)) the first color sensing data SdataR and the second color sensing data SdataG that have been extracted during a previous period. The third temperature data generated from the controller 800 may be stored in the memory 706. Here, the third temperature data may be generated using the first color sensing data SdataR, the second color sensing data SdataG, and the third color sensing data SdataB, so that the third temperature data may more accurately reflect the temperature of the pixel component 14 compared to that of the second temperature data. The timing controller 11 may sense the temperature of the pixel component 14 using the third temperature data stored in the memory 706.

As described above, in the embodiment of the disclosure shown in FIG. 10, each time the first pixels, the second pixels, and the third pixels each are sensed, the temperature data may be updated. In other words, compared to the comparative example of FIG. 5, in the embodiment of the disclosure shown in FIG. 10, the cycle of the temperature update may be reduced to ⅓, so that the temperature of the pixel component 14 may be rapidly sensed.

In other words, in the embodiment of the disclosure shown in FIG. 10, the temperature data may be updated every second time duration T2 shorter than the first time duration T1, so that the reliability of the display device 10 may be enhanced. As described above, in the embodiment of the disclosure shown in FIG. 10, the temperature of the pixel component 14 may be sensed at least two times during a period in which all of the pixels included in the pixel component 14 are sensed.

Figure 11:
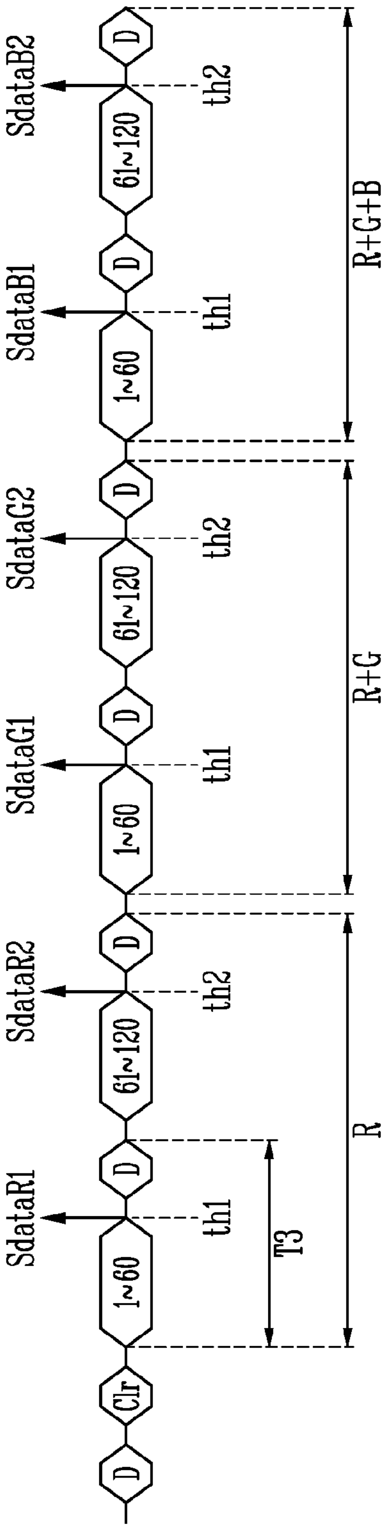
FIG. 11 is a diagram illustrating an embodiment of a method of sensing the temperature of the pixel component in accordance with the disclosure.

FIG. 11 is a diagram illustrating an embodiment of a method of sensing the temperature of the pixel component 14 in accordance with the disclosure.

Referring to FIG. 11, information about a plurality of threshold values th1 and th2 corresponding to time points of temperature information update may be stored in the memory 706. Here, the information about the threshold values th1 and th2 may correspond to a time point at which the temperature is updated when sensing data Sdata is extracted from each color of pixels (the first pixels, the second pixels, and the third pixels). In an embodiment, in the case where information about two threshold values th1 and th2 is stored in the memory 706, the temperature information may be updated two times during a process in which sensing data Sdata is extracted from a predetermined color of pixels, for example.

In an embodiment, the first threshold value th1 may correspond to a time point at which 50% of the sensing data Sdata is extracted from the predetermined color of pixels. The second threshold value th2 may correspond to a time point at which 100% of the sensing data Sdata is extracted from the predetermined color of pixels.

First, while a scan signal is randomly supplied to the scan lines S1 and S2 during the sensing period after the memory 706 is initialized, the sensing data Sdata may be sequentially extracted from the first pixels of the pixel component 14. Here, the controller 800 may monitor whether sensing data Sdata of the first threshold value th1 or more has been extracted from the first pixels. In the case where the sensing data Sdata of the first threshold value th1 or more has been extracted from the first pixels, the controller 800 may add and/or average the extracted sensing data Sdata and generate first red sensing data SdataR1. Thereafter, the controller 800 may generate first temperature data using the first red sensing data SdataR1, and store the generated first temperature data in the memory 706.

The timing controller 11 may sense the temperature of the pixel component 14 using the first temperature data stored in the memory 706. In the embodiment of the disclosure shown in FIG. 11, the temperature of the pixel component 14 may be sensed every third time duration T3 shorter than the second time duration T2, so that the reliability of the display device 10 may be enhanced. Here, the third time duration T3 may be set to a time corresponding to approximately ⅙ of the first time duration T1.

After the first temperature data is stored in the memory 706, the controller 800 monitors whether sensing data Sdata of the second threshold value th2 or more has been extracted from the first pixels. Here, the second threshold value th2 may correspond to the number of all first pixels, and may be omitted.

In the case where the sensing data Sdata of the second threshold value th2 or more has been extracted from the first pixels (i.e., in the case where the sensing data has been extracted from all of the first pixels), the controller 800 may add and/or average the extracted sensing data Sdata and generate second red sensing data SdataR2. Thereafter, the controller 800 may generate second temperature data using the second red sensing data SdataR2, and store the generated second temperature data in the memory 706. In addition, the second red sensing data SdataR2 may be generated including the first red sensing data SdataR1, so that the second temperature data may more accurately reflect the temperature of the pixel component 14 compared to that of the first temperature data.

Thereafter, while a scan signal is randomly supplied to the scan lines S1 and S2, sensing data Sdata may be sequentially extracted from the second pixels of the pixel component 14. The controller 800 may monitor whether sensing data Sdata of the first threshold value th1 or more has been extracted from the second pixels. In the case where the sensing data Sdata of the first threshold value th1 or more has been extracted from the second pixels, the controller 800 may add and/or average the extracted sensing data Sdata and generate first green sensing data SdataG1. Thereafter, the controller 800 may generate third temperature data using the first green sensing data SdataG1, and store the generated third temperature data in the memory 706.

In addition, the first green sensing data SdataG1 may be generated including the second red sensing data SdataR2, so that the third temperature data may more accurately reflect the temperature of the pixel component 14 compared to that of the second temperature data.

After the third temperature data is stored in the memory 706, the controller 800 monitors whether the sensing data Sdata of the second threshold value th2 or more has been extracted from the second pixels. In the case where the sensing data Sdata of the second threshold value th2 or more has been extracted from the second pixels (i.e., in the case where the sensing data has been extracted from all of the second pixels), the controller 800 may add and/or average the extracted sensing data Sdata and generate second green sensing data SdataG2. Thereafter, the controller 800 may generate fourth temperature data using the second green sensing data SdataG2, and store the generated fourth temperature data in the memory 706. In addition, the second green sensing data SdataG2 may be generated including the first green sensing data SdataG1, so that the fourth temperature data may more accurately reflect the temperature of the pixel component 14 compared to that of the third temperature data.

Furthermore, in the same manner as that of the above-mentioned process, fifth temperature data corresponding to first blue sensing data SdataB1 and first blue sensing data SdataB1 may be obtained from the third pixels and stored in the memory 706. Here, the first blue sensing data SdataB1 may be generated including the second green sensing data SdataG2, so that the fifth temperature data may more accurately reflect the temperature of the pixel component 14 compared to that of the fourth temperature data.

Likewise, in the same manner as that of the above-mentioned process, sixth temperature data corresponding to second blue sensing data SdataB2 and second blue sensing data SdataB2 may be obtained from the third pixels and stored in the memory 706. Here, the second blue sensing data SdataB2 may be generated including the first blue sensing data SdataB1, so that the sixth temperature data may more accurately reflect the temperature of the pixel component 14 compared to that of the fifth temperature data.

As described above, in the embodiment of the disclosure shown in FIG. 11, when sensing data Sdata is extracted from one color of pixels using information about the threshold values th1 and th2, the temperature data may be updated twice, so that the cycle of the temperature update may be reduced to ⅙.

In other words, in the embodiment of the disclosure shown in FIG. 11, the temperature data may be updated every third time duration T3 shorter than the second time duration T2, so that the reliability of the display device 10 may be enhanced.

Although FIG. 11 illustrates that the temperature data is updated twice when sensing data Sdata is extracted from one color of pixels, the disclosure is not limited thereto. In an embodiment, when sensing data Sdata is extracted from one color of pixels, the temperature data may be updated two or more times, for example.

Figure 12:
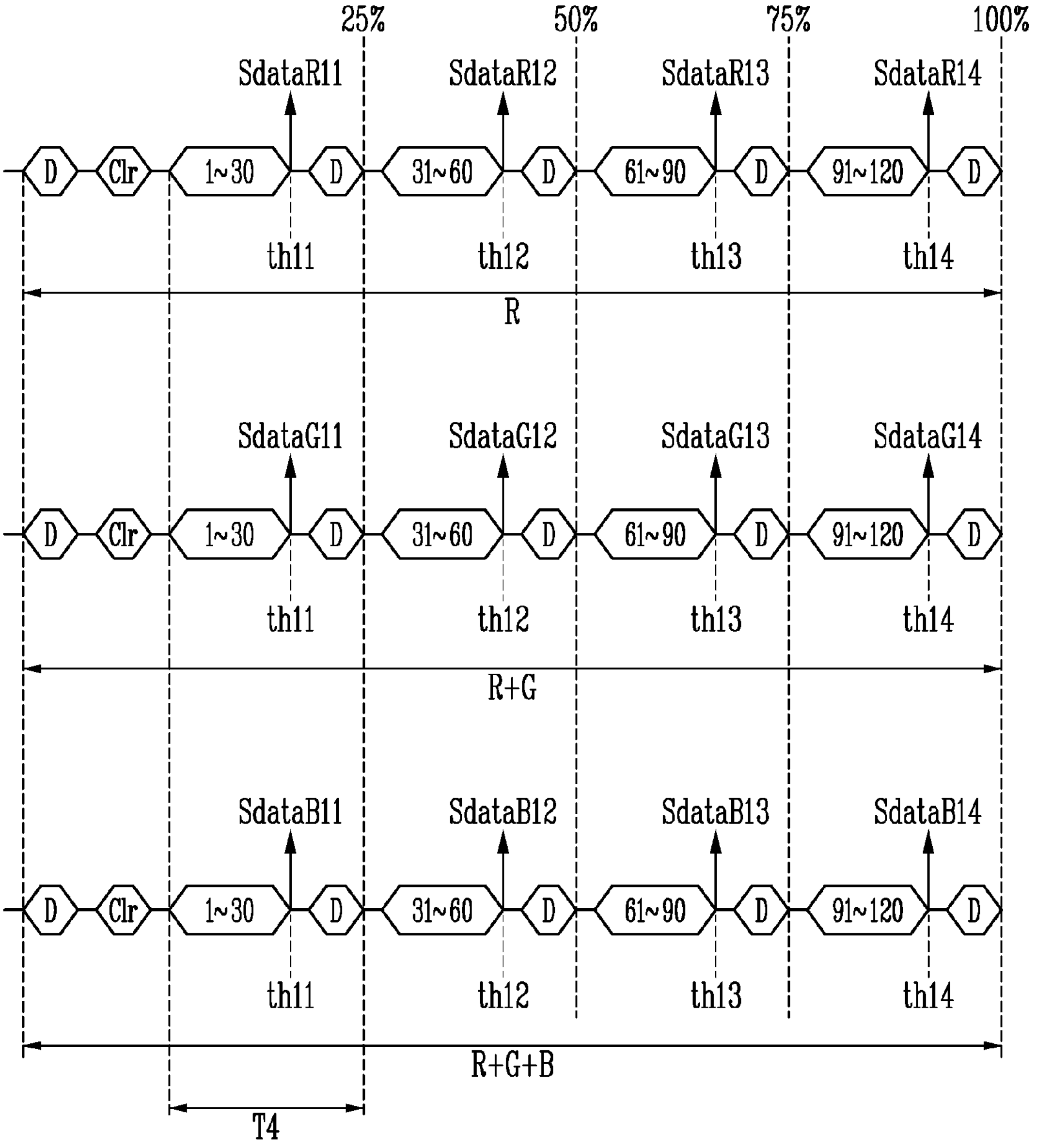
FIG. 12 is a diagram illustrating a method of sensing the temperature of the pixel component in accordance with an embodiment of the disclosure.

FIG. 12 is a diagram illustrating an embodiment of a method of sensing the temperature of the pixel component 14 in accordance with the disclosure.

In the temperature sensing method of FIG. 12, the number of threshold values th11, th12, th13, and th14 is greater than that of FIG. 11, and a driving method of the embodiment of FIG. 12 is substantially identical or similar to that of FIG. 11.

Referring to FIG. 12, information about a plurality of threshold values th11, th12, th13, and th14 corresponding to time points of temperature information update may be stored in the memory 706. Here, the information about the threshold values th11, th12, th13, and th14 may correspond to a time point at which the temperature is updated during a process of extracting sensing data Sdata from one color of pixels (the first pixels, the second pixels, or the third pixels). In an embodiment, in the case where information about four threshold values th11, th12, th13, and th14 is stored in the memory 706, the temperature information may be updated four times in response to sensing data Sdata of a predetermined color of pixels, for example.

Here, the first threshold value th11 may correspond to a time point at which 25% of the sensing data Sdata is extracted from the predetermined color of pixels. The second threshold value th12 may correspond to a time point at which 50% of the sensing data Sdata is extracted from the predetermined color of pixels. The third threshold value th13 may correspond to a time point at which 75% of the sensing data Sdata is extracted from the predetermined color of pixels. The fourth threshold value th14 may correspond to a time point at which 100% of the sensing data Sdata is extracted from the predetermined color of pixels.

First, while a scan signal is randomly supplied to the scan lines S1 and S2 during the sensing period after the memory 706 is initialized, the sensing data Sdata may be sequentially extracted from the first pixels of the pixel component 14. Here, the controller 800 may monitor whether sensing data Sdata of the first threshold value th11 or more has been extracted from the first pixels. In the case where the sensing data Sdata of the first threshold value th11 or more has been extracted from the first pixels, the controller 800 may add and/or average the extracted sensing data Sdata and generate first red sensing data SdataR11. Thereafter, the controller 800 may generate first temperature data using the first red sensing data SdataR11, and store the generated first temperature data in the memory 706.

The timing controller 11 may sense the temperature of the pixel component 14 using the first temperature data stored in the memory 706. As described above, in the embodiment of the disclosure shown in FIG. 12, the temperature of the pixel component 14 may be sensed every fourth time duration T4 shorter than the third time duration T3. Here, the third time duration T3 may be set to a time corresponding to approximately 1/12 of the first time duration T1.

After the first temperature data is stored in the memory 706, the controller 800 monitors whether the sensing data Sdata of the second threshold value th12 or more has been extracted from the second pixels. In the case where the sensing data Sdata of the second threshold value th12 or more has been extracted from the second pixels, the controller 800 may add and/or average the extracted sensing data Sdata and generate second red sensing data SdataR12. Thereafter, the controller 800 may generate second temperature data using the second red sensing data SdataR12, and store the generated second temperature data in the memory 706. In addition, the second red sensing data SdataR12 may be generated including the first red sensing data SdataR11, so that the second temperature data may more accurately reflect the temperature of the pixel component 14 compared to that of the first temperature data.

After the second temperature data is stored in the memory 706, the controller 800 monitors whether sensing data Sdata of the third threshold value th13 or more has been extracted from the third pixels. In the case where the sensing data Sdata of the third threshold value th13 or more has been extracted from the third pixels, the controller 800 may add and/or average the extracted sensing data Sdata and generate third red sensing data SdataR13. Thereafter, the controller 800 may generate third temperature data using the third red sensing data SdataR13, and store the generated first temperature data in the memory 706. In addition, the third red sensing data SdataR13 may be generated including the second red sensing data SdataR12, so that the third temperature data may more accurately reflect the temperature of the pixel component 14 compared to that of the second temperature data.

After the third temperature data is stored in the memory 706, the controller 800 monitors whether sensing data Sdata of the fourth threshold value th14 or more has been extracted from the first pixels. In the case where the sensing data Sdata of the fourth threshold value th14 or more has been extracted from the first pixels, the controller 800 may add and/or average the extracted sensing data Sdata and generate fourth red sensing data SdataR14. Thereafter, the controller 800 may generate fourth temperature data using the fourth red sensing data SdataR14, and store the generated fourth temperature data in the memory 706. In addition, the fourth red sensing data SdataR14 may be generated including the third red sensing data SdataR13, so that the fourth temperature data may more accurately reflect the temperature of the pixel component 14 compared to that of the third temperature data.

Thereafter, in the same manner as that of the above-mentioned process, first green sensing data SdataG11 is obtained from the second pixels, and fifth temperature data corresponding thereto is stored in the memory 706. Here, the first green sensing data SdataG11 may be generated including the fourth red sensing data SdataR14, so that the fifth temperature data may more accurately reflect the temperature of the pixel component 14 compared to that of the fourth temperature data.

Likewise, in the same manner as that of the above-mentioned process, second green sensing data SdataG12, third green sensing data SdataG13, and fourth green sensing data SdataG14 may be extracted. Sixth temperature data, seventh temperature data, and eighth temperature data, which respectively correspond to the second, third, and fourth green sensing data SdataG12, SdataG13, and SdataG14, may be sequentially stored in the memory 706.

Furthermore, in the same manner as that of the above-mentioned process, first blue sensing data SdataB11 is obtained from the third pixels, and ninth temperature data corresponding thereto is stored in the memory 706. Here, the first blue sensing data SdataB11 may be generated including the fourth green sensing data SdataG14, so that the ninth temperature data may more accurately reflect the temperature of the pixel component 14 compared to that of the eighth temperature data.

Likewise, in the same manner as that of the above-mentioned process, second blue sensing data SdataB12, third blue sensing data SdataB13, and fourth blue sensing data SdataB14 may be extracted. Tenth temperature data, eleventh temperature data, and twelfth temperature data, which respectively correspond to the second, third, and fourth blue sensing data SdataB12, SdataB13, and SdataB14, may be sequentially stored in the memory 706.

As described above, in the embodiment of the disclosure shown in FIG. 12, when sensing data Sdata is extracted from one color of pixels using the threshold values th11 th12, th13, and th14, the temperature data may be updated four times, so that the cycle of the temperature update may be reduced to 1/12.

In addition, although FIG. 11 illustrates that two threshold values th1 and th2 are stored in the memory 706 and FIG. 12 illustrates that four threshold values th11, th12, th13, and th14 are stored in the memory 706, the disclosure is not limited thereto. In an embodiment, at least one or more threshold values are stored in the memory 706, and temperature update time points may be controlled in response to the threshold values stored in the memory 706, for example.

Figure 13:
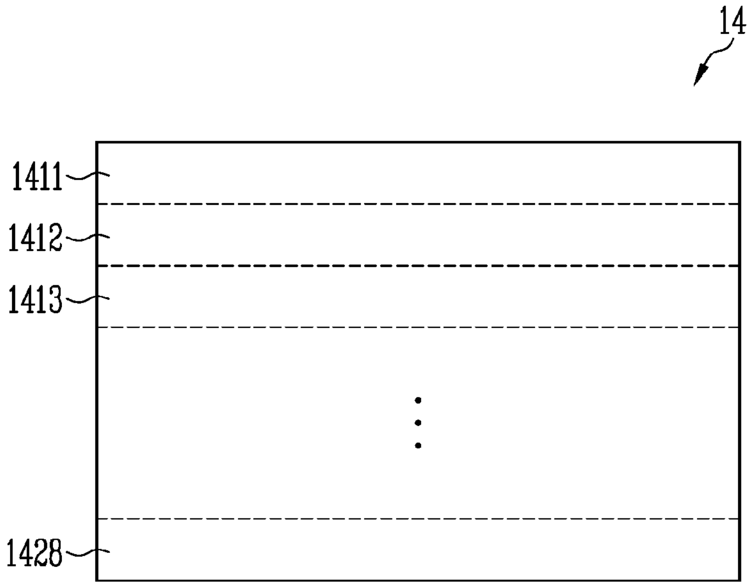
FIG. 13 is a diagram illustrating an embodiment of a pixel component in accordance with the disclosure.

FIG. 13 is a diagram illustrating an embodiment of a pixel component 14 in accordance with the disclosure.

Referring to FIG. 13, the pixel component 14 in an embodiment of the disclosure may be divided into a plurality of blocks 1411, 1412, 1413, . . . , 1428 based on pixel rows.

The blocks 1411 to 1428 may be divided from each other such that each includes at least two or more pixel rows. In an embodiment, in the case where the display device 10 is a UHD device including 2160 pixel rows, the blocks 1411 to 1428 may be divided into 18 blocks each including 120 pixel rows, for example. In the case where the pixel component 14 includes a plurality of blocks 1411 to 1428, the temperature may be updated for each of the blocks 1411 to 1428.

In more detail, additional block information of the pixel component 14 may be stored in the memory 706. The controller 800 may update the temperature information on a block basis. In an embodiment, in the case where, as illustrated in FIG. 12, four threshold values th11, th12, th13, and th14 are stored in the memory 706, the controller 800 may update temperature data twelve times for each of the blocks 1411 to 1428, for example.

In other words, in the embodiment of FIG. 13, the pixel component 14 is divided into a plurality of blocks 1411 to 1428, and the operating process thereof, other than an operation of updating the temperature data on a block basis, is substantially the same as that of the embodiments of FIG. 10 to 12 described above.

Figure 14:
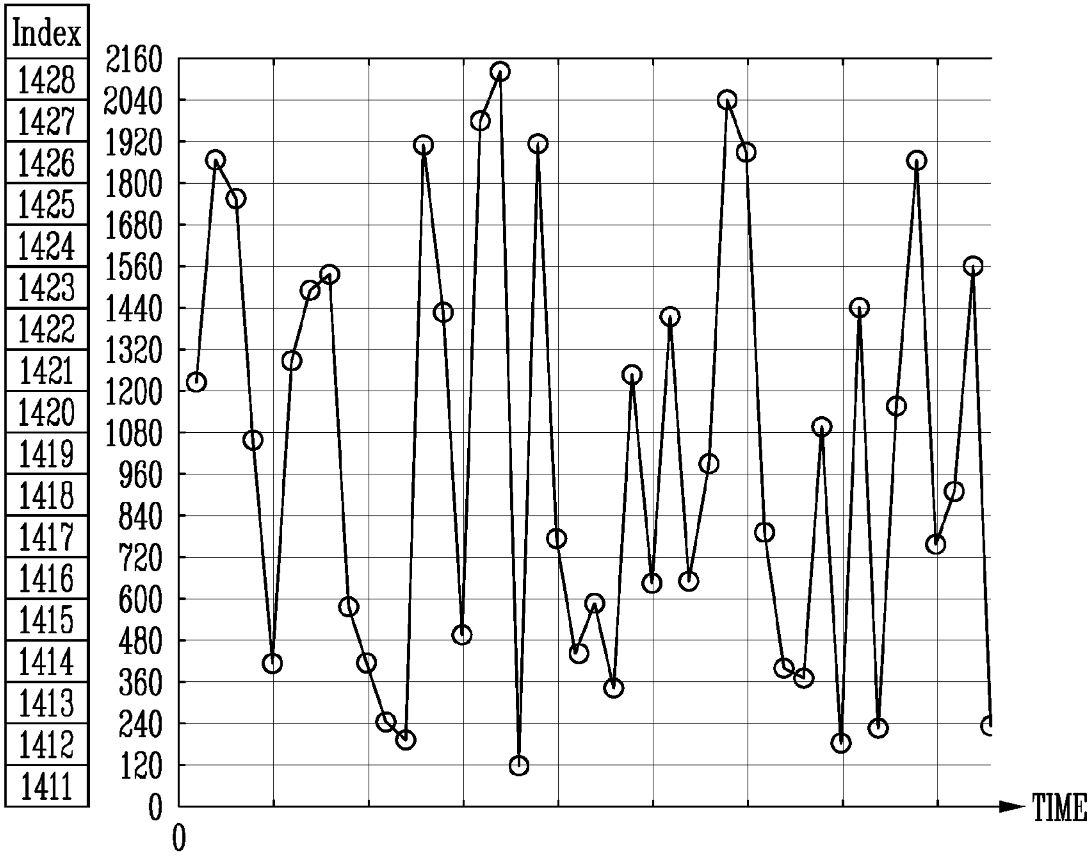
FIG. 14 is a diagram illustrating a process of updating temperature data in the case where, as illustrated in FIG. 13, the pixel component includes a plurality of blocks.

FIG. 14 is a diagram illustrating a process of updating the temperature data in the case where, as illustrated in FIG. 13, the pixel component includes a plurality of blocks. In FIG. 14, for convenience of explanation, it is assumed that sensing data Sdata is extracted from the first pixel.

Referring to FIG. 14, during a sensing period, scan signals may be randomly supplied to the scan lines S1 and S2 such that all of the pixel rows of the pixel component 14 may be uniformly scanned. Then, sensing data Sdata may be extracted from each of the blocks 1411 to 1428 on a pixel row basis, and the extracted sensing data Sdata may be added by the adding component 802 for each of blocks 1411 to 1428.

In each of the blocks 1411 to 1428, in the case where sensing data Sdata of the first threshold value th11 or more is extracted, the controller 800 may store temperature information of each of the blocks 1411 to 1428 in the memory 706 using sensing data added by the adding component 802 or sensing data averaged by the averaging component 804.

In an embodiment, at a first time point t11, temperature information of the second block 1412, the sixth block 1416, the eighth block 1418, the tenth block 1420, the twelfth block 1422, the fourteenth block 1424, the fifteenth block 1425, and the eighteenth block 1428 may be stored in the memory 706, for example. The timing controller 11 may determine the temperature of the pixel component 14 using the temperature information stored in the memory 706.

Thereafter, passing through a second time point t12, a third time point t13, and a fourth time point t14, the temperature information of each of the blocks 1141 to 1428 may be stored in the memory 706. In the same manner as the foregoing process, the temperature information of the second pixels and the third pixels may also be stored in the memory 706.

In the case where, as illustrated in FIGS. 13 and 14, the temperature data is updated for each of the blocks 1411 to 1428, the temperature information corresponding to the location of each of the blocks 1411 to 1428 may be easily determined.

Although FIG. 14 illustrates that the temperature data is updated for each of the blocks 1411 to 1428 in the embodiment of the disclosure illustrated in FIG. 12, the disclosure is not limited thereto. In an embodiment, the temperature data may be updated for each of the blocks 1411 to 1428 in the embodiment illustrated in FIG. 10 or the embodiment illustrated in FIG. 11, for example.

Figure 15:
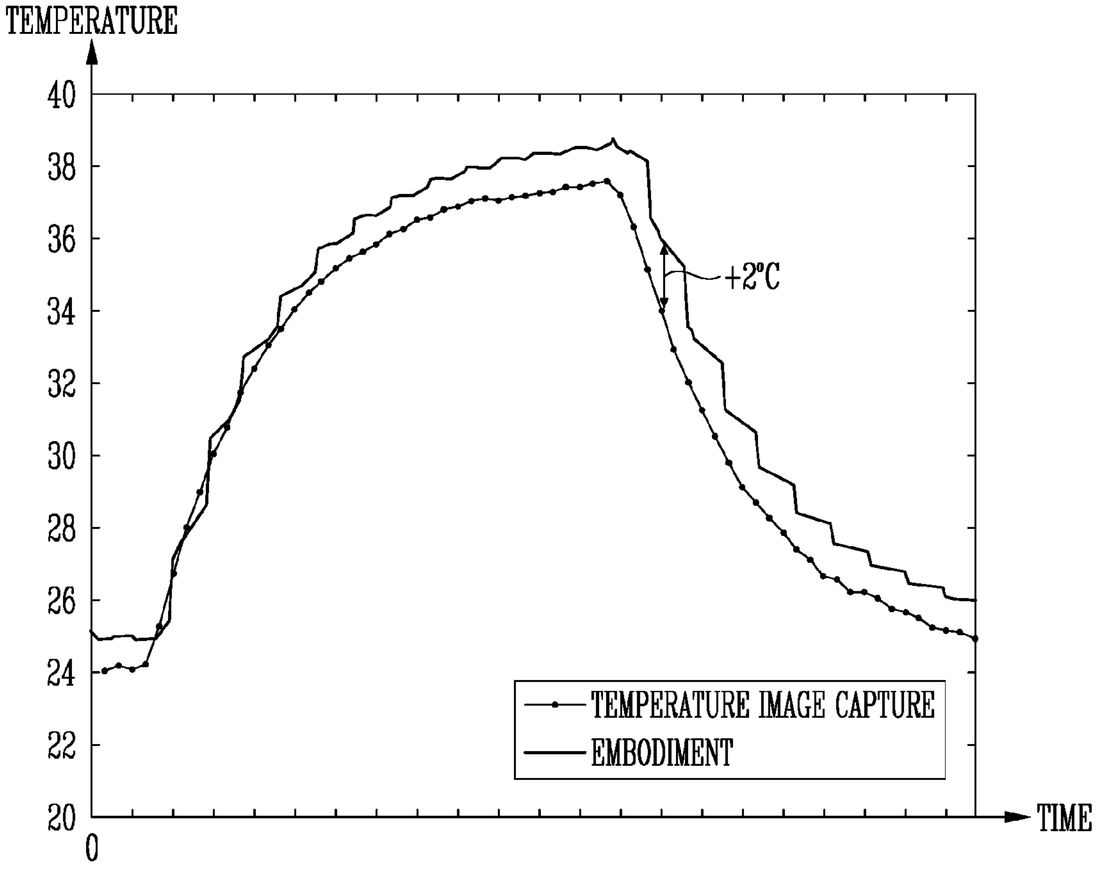
FIG. 15 is a graph illustrating an embodiment of errors of temperature of FIG. 12 in accordance with the disclosure.

FIG. 15 is a graph illustrating an embodiment of errors of temperature of FIG. 12 in accordance with the disclosure. In an embodiment, the graph of FIG. 15 may correspond to the case where a UHD television TV is driven at about 120 Hz, for example.

Referring to FIG. 15, in the embodiment of the disclosure, the timing controller 11 may update the temperature of the pixel component 14 at an interval of a fourth time duration T4. As such, in the case where the temperature of the pixel component 14 is updated at an interval of a fourth time duration T4, the temperature of the pixel component 14 may be rapidly sensed, so that errors of the temperature information may be minimized.

In an embodiment, in the case where a UHD television TV having 2160 pixel rows is driven at about 144 Hz, the fourth time duration T4 may be set to approximately 4 seconds, for example. In the case where the UHD television TV is driven at about 120 Hz, the fourth time duration T4 may be set to approximately 5 seconds. In the case where the UHD television TV is driven at 60 Hz, the fourth time duration T4 may be set to approximately 10 seconds.

Furthermore, in the case where the UHD television TV is driven at about 175 Hz, the fourth time duration T4 may be set to approximately about 3 seconds. In the case where the UHD television TV is driven at about 120 Hz, the fourth time duration T4 may be set to approximately 4 seconds. In the case where the UHD television TV is driven at about 60 Hz, the fourth time duration T4 may be set to approximately 7 seconds.

As such, when the temperature is updated at an interval of the fourth time duration T4, as shown in the graph of FIG. 15, there is a temperature difference of approximately 2° C. between a temperature measured by actually capturing an image of the pixel component 14 and a temperature measured using the sensing data Sdata. In other words, in the disclosure, the interval of the temperature update time may be set to a relatively short time, so that the temperature of the pixel component 14 may be reliably sensed, whereby the reliability of the display quality may be enhanced.

Figure 16:
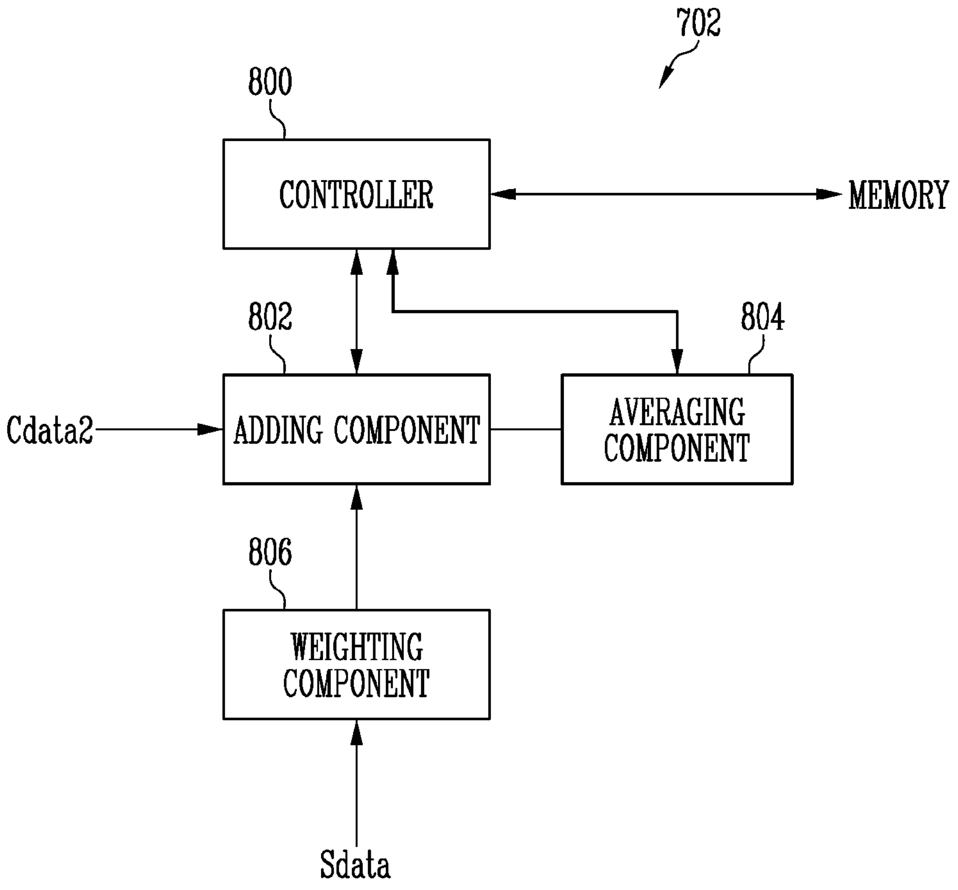
FIG. 16 is a diagram illustrating an embodiment of the processor shown in FIG. 7 in accordance with the disclosure.

FIG. 16 is a diagram illustrating an embodiment of the processor 702 shown in FIG. 7 in accordance with the disclosure.

In the following description of FIG. 16, the same reference numerals will be used to designate the same components as those of FIG. 9, and detailed explanation thereof will be omitted.

Referring to FIG. 16, a processor 702 in an embodiment of the disclosure may further include a weighting component 806. The weighting component 806 may add a weight value to the sensing data Sdata in response to the color of pixels.

In detail, even though sensing data Sdata is extracted the first pixel, the second pixel, and the third pixel under the same conditions, the sensing data Sdata may be set to different values. Actually, during a processing operation, the first pixel, the second pixel, and the third pixel may be set to different values in capacitance of a capacitor, material of a light-emitting element, or the like. Hence, under the same conditions, there may be a difference in sensing data Sdata between the first, second, and third pixels.

The weighting component 806 may reflect a weight value in at least one of sensing data Sdata extracted from the first pixel, sensing data Sdata extracted from the second pixel, and sensing data Sdata extracted from the third pixel, thus correcting the corresponding sensing data Sdata. Here, the weight value may be preset such that the sensing data Sdata is the same or similar between the first pixel, the second pixel, and the third pixel under the same conditions. In an embodiment, the weight value may be preset to correspond to each of the first pixel, the second pixel, and the third pixel, and stored in the memory 706 or the like.

In a display device and a method of driving the display device in embodiments of the disclosure, a variation in temperature of a pixel component (or panel) may be rapidly sensed in response to sensing of pixels by an external compensation method. In other words, in an embodiment disclosure, during a period in which all of the pixels of the pixel component are sensed, the temperature of the pixel component may be sensed at least two times, so that the reliability of the display device may be secured.

In a display device and a method of driving the display device in an embodiment of the disclosure, because the variation in temperature of the pixel component may be rapidly sensed, the accuracy of an operation of correcting data may be enhanced.

However, effects of the disclosure are not limited to the above-described effects, and various modifications are possible without departing from the spirit and scope of the disclosure.

While embodiments of the disclosure have been described above, those skilled in the art will appreciate that various modifications, additions and substitutions are possible, without departing from the scope and spirit of the disclosure claimed in the appended claims.

What is claimed is:

1. A display device comprising:

a pixel component including first pixels which emits light having a first color, and second pixels which emits light having a second color different from the first color;

a sensing component which extracts, during a sensing period, first sensing data from the first pixels, and second sensing data from the second pixels; and a temperature determiner which senses a temperature of the pixel component using the first sensing data and the second sensing data, wherein the temperature determiner senses, when the first sensing data is supplied to the temperature determiner, the temperature of the pixel component at least one time, and the temperature determiner adds the first sensing data to the second sensing data when the second sensing data is supplied to the temperature determiner, and senses the temperature of the pixel component.

2. The display device according to claim 1, wherein the temperature determiner senses, when the second sensing data is supplied to the temperature determiner, the temperature of the pixel component at least one time.

3. The display device according to claim 2, wherein the first sensing data and the second sensing data are sequentially supplied during the sensing period.

4. The display device according to claim 2, wherein the temperature determiner comprises:

a memory which stores temperature data corresponding to sensed temperature output from the temperature determiner;

a determiner which determines, using control data supplied from an external device, a position of a first pixel of the first pixels or a second pixel of the second pixels from which the first sensing data or the second sensing data is extracted; and a processor which receives position information from the determiner, and stores the temperature data in the memory at least one time when each of the first sensing data and the second sensing data is supplied to the processor.

5. The display device according to claim 4, wherein when pieces of first sensing data and pieces of second sensing data sequentially supplied, the processor comprises an adding component which sequentially adds the pieces of first sensing data and the pieces of second sensing data to each other.

6. The display device according to claim 5, wherein the processor further comprises a controller which generates the temperature data using added sensing data output from the adding component, wherein the temperature determiner further comprises a look up table which stores temperature information corresponding to the added sensing data.

7. The display device according to claim 5, wherein the processor further comprises:

an averaging component which averages added sensing data output from the adding component; and a controller which generates the temperature data using averaged sensing data output from the averaging component, and wherein the temperature determiner further comprises a look up table which stores temperature information corresponding to the averaged sensing data.

8. The display device according to claim 4, wherein the pixel component is divided into a plurality of blocks to include two or more pixel rows, and wherein the processor stores the temperature data in the memory in units of the plurality of blocks.

9. The display device according to claim 8, wherein information about a plurality of threshold values and information about the plurality of blocks are formed in the memory, and wherein the processor stores, when the first sensing data is supplied to the processor, the temperature data in the memory at least two times for each of the plurality of blocks in response to the information about the plurality of threshold values.

10. The display device according to claim 9, wherein the processor stores, when the second sensing data is supplied to the processor, the temperature data in the memory at least two times for each of the plurality of blocks in response to the information about the plurality of threshold values.

11. The display device according to claim 4, wherein the processor further comprises a weighting component which applies different weight values to the first sensing data and the second sensing data.

12. The display device according to claim 1, wherein the pixel component further comprises third pixels which emits light having a third color different from the first color and the second color.

13. The display device according to claim 12, wherein the sensing component extracts third sensing data from the third pixels during the sensing period, and wherein the temperature determiner adds the first sensing data and the second sensing data to the third sensing data when the third sensing data is supplied to the temperature determiner, and senses the temperature of the pixel component at least one time.

14. A method of driving a display device including a first color of first pixels, a second color of second pixels, and a third color of third pixels, the method comprising:

receiving, during a sensing period, pieces of first sensing data from the first pixels, pieces of second sensing data from the second pixels, and pieces of third sensing data from the third pixels; and sensing a temperature of a pixel component at least one time each time the pieces of the first sensing data, the pieces of the second sensing data, and the pieces of the third sensing data are supplied, wherein in sensing the temperature, the pieces of the first sensing data, the pieces of the second sensing data, and the pieces of the third sensing data are sequentially supplied, and the pieces of the first sensing data, the pieces of the second sensing data, and the pieces of the third sensing data are sequentially added.

15. The method according to claim 14, wherein sensing the temperature comprises sensing the temperature of the pixel component at a set cycle using at least one of an added value of the pieces of the first sensing data, an added value of the pieces of the second sensing data, and an added value of the pieces of the third sensing data, or using an average of the added value.

16. The method according to claim 14, wherein the pixel component is divided into a plurality of blocks, and wherein sensing the temperature comprises sensing the temperature of the pixel component in units of the plurality of blocks.

17. The method according to claim 16, wherein the temperature is sensed at least two times in each of the plurality of blocks.

* * * * *